US012617420B2

(12) United States Patent
Xu et al.

(10) Patent No.: US 12,617,420 B2
(45) Date of Patent: May 5, 2026

(54) DRIVER WARNING SYSTEM

(71) Applicant: Honda Motor Co., Ltd., Tokyo (JP)

(72) Inventors: Aolin Xu, Santa Clara, CA (US);
Chenran Li, Fremont, CA (US); **Enna
Sachdeva**, Santa Clara, CA (US);
Teruhisa Misu, San Jose, CA (US);
Behzad Dariush, San Ramon, CA
(US); Kentaro Yamada, Tokyo (JP);
Kikuo Fujimura, Palo Alto, CA (US)

(73) Assignee: Honda Motor Co., Ltd., Tokyo (JP)

( * ) Notice: Subject to any disclaimer, the term of this
patent is extended or adjusted under 35
U.S.C. 154(b) by 127 days.

(21) Appl. No.: 18/618,444

(22) Filed: Mar. 27, 2024

(65) Prior Publication Data

US 2025/0074445 A1      Mar. 6, 2025

Related U.S. Application Data

(60) Provisional application No. 63/580,675, filed on Sep.
5, 2023.

(51) Int. Cl.
B60Q 1/00          (2006.01)
B60W 30/095          (2012.01)
(Continued)

(52) U.S. Cl.
CPC ........ B60W 50/14 (2013.01); B60W 30/0956
(2013.01); B60W 40/09 (2013.01);
(Continued)

(58) Field of Classification Search
CPC .. B60W 50/14; B60W 30/0956; B60W 40/09;
B60W 50/0098; B60W 2050/143;
(Continued)

(56) References Cited

U.S. PATENT DOCUMENTS

2019/0176846 A1* 6/2019 Movert ................ B60W 40/09
2022/0161811 A1* 5/2022 Lu ..................... B60W 60/0053
(Continued)

OTHER PUBLICATIONS

P. An and C. Harris, "An intelligent driver warning system for
vehicle collision avoidance," IEEE Transactions on Systems, Man,
and Cybernetics—Part A: Systems and Humans, vol. 26, No. 2, pp.
254-261, 1996.

(Continued)

*Primary Examiner* — Anh V La
(74) *Attorney, Agent, or Firm* — Rankin, Hill & Clark
LLP

(57)          ABSTRACT

A vehicle includes a ranged sensor that generates time-series
data indicating positions of objects in an environment sur-
rounding the vehicle, a user interface configured to warn the
driver of a predicted collision between the vehicle and one
of the objects in the environment, and at least one processor
including an ECU operatively connected to the ranged
sensor and the user interface. The processor records control
inputs by the driver driving the vehicle, and develops a
driver behavior model associated with the driver driving the
vehicle based on the control inputs. The processor also
predicts trajectories of the objects and the vehicle based on
the time-series data and the driver behavior model, and
predicts a collision between the vehicle and one of the
objects based on the predicted trajectories. The processor
also generates a warning indicating the predicted collision to
the driver.

20 Claims, 10 Drawing Sheets

(51) Int. Cl.
| | |
|---|---|
| *B60W 40/09* | (2012.01) |
| *B60W 50/00* | (2006.01) |
| *B60W 50/14* | (2020.01) |

(52) U.S. Cl.
CPC ... *B60W 50/0098* (2013.01); *B60W 2050/143* (2013.01); *B60W 2050/146* (2013.01); *B60W 2554/4041* (2020.02); *B60W 2554/4045* (2020.02)

(58) Field of Classification Search
CPC ... B60W 2050/146; B60W 2554/4041; B60W 2554/4045; B60W 2556/10; B60W 50/0097; B60W 30/095
USPC ...................... 340/425.5, 435, 436, 439, 903
See application file for complete search history.

(56) References Cited

U.S. PATENT DOCUMENTS

| | | | |
|---|---|---|---|
| 2022/0171401 A1* | 6/2022 | Usman | G05D 1/0221 |
| 2023/0166731 A1* | 6/2023 | Heck | G06N 3/04 |

OTHER PUBLICATIONS

M. Kamrani, S. Concas, A. Kourtellis, M. Rabbani, V. C. Kummetha, and O. Dokur, "Drivers' reactions to connected vehicle forward collision warnings: Leveraging real-world data from the thea cv pilot," Transportation research part F: traffic psychology and behaviour, vol. 92, pp. 108-120, 2023.

S. H. Lee, S. Lee, and M. H. Kim, "Development of a driving behaviorbased collision warning system using a neural network," International journal of automotive technology, vol. 19, pp. 837-844, 2018.

J. Pyo, J. Bang, and Y. Jeong, "Front collision warning based on vehicle detection using cnn," in 2016 International SoC Design Conference (ISOCC). IEEE, 2016, pp. 163-164.

X. Wu and L. N. Boyle, "Auditory messages for intersection movement assist (ima) systems: effects of speech-and nonspeech-based cues," Human factors, vol. 63, No. 2, pp. 336-347, 2021.

T. Wu, E. Sachdeva, K. Akash, X. Wu, T. Misu, and J. Ortiz, "Toward an adaptive situational awareness support system for urban driving," in 2022 IEEE Intelligent Vehicles Symposium (IV). IEEE, 2022, pp. 1073-1080.

Y. Yuan, Y. Lu, and Q. Wang, "Adaptive forward vehicle collision warning based on driving behavior," Neurocomputing, vol. 408, pp. 64-71, 2020.

L. Yue, M. Abdel-Aty, Y. Wu, J. Ugan, and C. Yuan, "Effects of forward collision warning technology in different pre-crash scenarios," Transportation research part F: traffic psychology and behaviour, vol. 76, pp. 336-352, 2021.

F. Bella and M. Silvestri, "Effects of directional auditory and visual warnings at intersections on reaction times and speed reduction times," Transportation research part F: traffic psychology and behaviour, vol. 51, pp. 88-102, 2017.

W.-J. Chang, Y. Hu, C. Li, W. Zhan, and M. Tomizuka, "Analyzing and enhancing closed-loop stability in reactive simulation," in 2022 IEEE 25th International Conference on Intelligent Transportation Systems (ITSC). IEEE, 2022, pp. 3665-3672.

W.-J. Chang, C. Tang, C. Li, Y. Hu, M. Tomizuka, and W. Zhan, "Editing driver character: Socially-controllable behavior generation for interactive traffic simulation," arXiv preprint arXiv:2303.13830, 2023.

J. Gu, C. Sun, and H. Zhao, "Densetnt: End-to-end trajectory prediction from dense goal sets," in Proceedings of the IEEE/CVF International Conference on Computer Vision, 2021, pp. 15 303-15 312.

L. Guo, Y. Jia, X. Hu, and F. Dong, "Forwarding collision assessment with the localization information using the machine learning method," Journal of advanced transportation, vol. 2022, 2022.

H. Hu, D. Isele, S. Bae, and J. F. Fisac, "Active uncertainty reduction for safe and efficient interaction planning: A shielding aware dual control approach," The International Journal of Robotics Research, 2023. [Online]. Available: https://doi.org/10.1177/02783649231215371.

S. M. Iranmanesh, H. N. Mahjoub, H. Kazemi, and Y. P. Fallah, "An adaptive forward collision warning framework design based on driver distraction," IEEE Transactions on Intelligent Transportation Systems, vol. 19, No. 12, pp. 3925-3934, 2018.

C. Li, C. Tang, H. Nishimura, J. Mercat, M. Tomizuka, and W. Zhan, "Residual q-learning: Offline and online policy customization without value," Advances in Neural Information Processing Systems, vol. 36, 2024.

C. Li, T. Trinh, L. Wang, C. Liu, M. Tomizuka, and W. Zhan, "Efficient game-theoretic planning with prediction heuristic for socially compliant autonomous driving," IEEE Robotics and Automation Letters, vol. 7, No. 4, pp. 10 248-10 255, 2022.

T. Salzmann, B. Ivanovic, P. Chakravarty, and M. Pavone, "Trajectron++: Dynamically-feasible trajectory forecasting with heterogeneous data," in Computer Vision—ECCV 2020: 16th European Conference, Glasgow, UK, Aug. 23-28, 2020, Proceedings, Part XVIII 16. Springer, 2020, pp. 683-700.

S. Suo, S. Regalado, S. Casas, and R. Urtasun, "Trafficsim: Learning to simulate realistic multi-agent behaviors," in Proceedings of the IEEE/CVF Conference on Computer Vision and Pattern Recognition, 2021, pp. 10 400-10 409.

W. Schwarting, A. Pierson, J. Alonso-Mora, S. Karaman, and D. Rus, "Social behavior for autonomous vehicles," Proceedings of the National Academy of Sciences, vol. 116, No. 50, pp. 24 972-24 978, 2019.

B. Varadarajan, A. Hefny, A. Srivastava, K. S. Refaat, N. Nayakanti, A. Cornman, K. Chen, B. Douillard, C. P. Lam, D. Anguelov et al., "Multipath++: Efficient information fusion and trajectory aggregation for behavior prediction," in 2022 International Conference on Robotics and Automation (ICRA). IEEE, 2022, pp. 7814-7821.

W. Yang, B. Wan, and X. Qu, "A forward collision warning system using driving intention recognition of the front vehicle and v2v communication," IEEE Access, vol. 8, pp. 11 268-11 278, 2020.

W. Zhan, J. Chen, C.-Y. Chan, C. Liu, and M. Tomizuka, "Spatially partitioned environmental representation and planning architecture for on-road autonomous driving," in 2017 IEEE Intelligent Vehicles Symposium (IV). IEEE, 2017, pp. 632-639.

W. Zhao, S. Gong, D. Zhao, F. Liu, N. Sze, and H. Huang, "Effects of collision warning characteristics on driving behaviors and safety in connected vehicle environments," Accident Analysis & Prevention, vol. 186, p. 107053, 2023.

M. Zhu, X. Wang, and J. Hu, "Impact on car following behavior of a forward collision warning system with headway monitoring," Transportation research part C: emerging technologies, vol. 111, pp. 226-244, 2020.

* cited by examiner

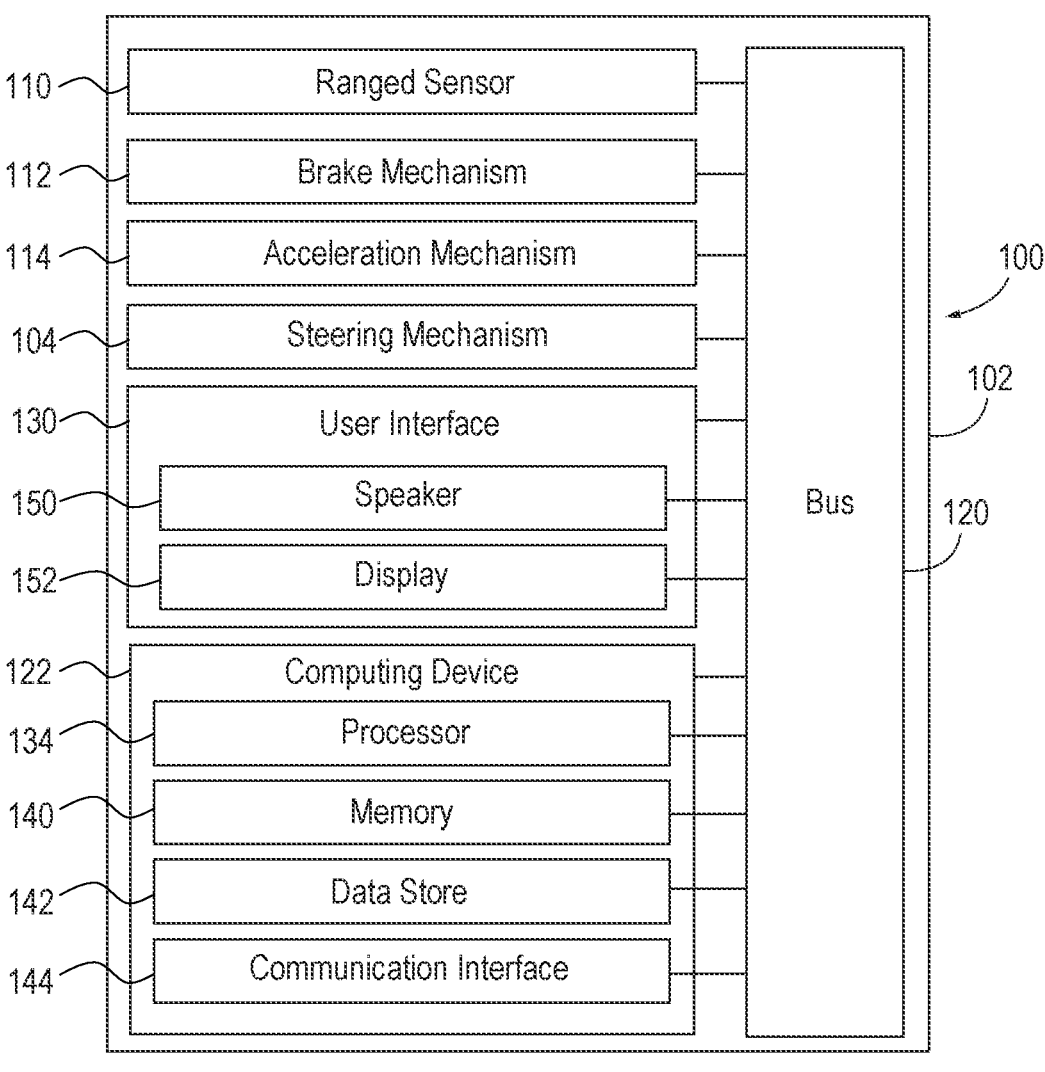
110 — Ranged Sensor
112 — Brake Mechanism
114 — Acceleration Mechanism
104 — Steering Mechanism
130 — User Interface
150 — Speaker
152 — Display
122 — Computing Device
134 — Processor
140 — Memory
142 — Data Store
144 — Communication Interface
Bus
100
102
120
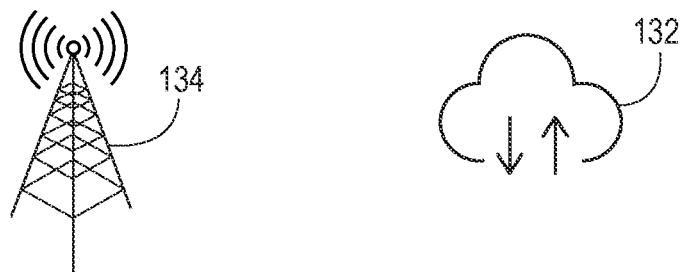
134
132
FIG. 1

Figure 5:
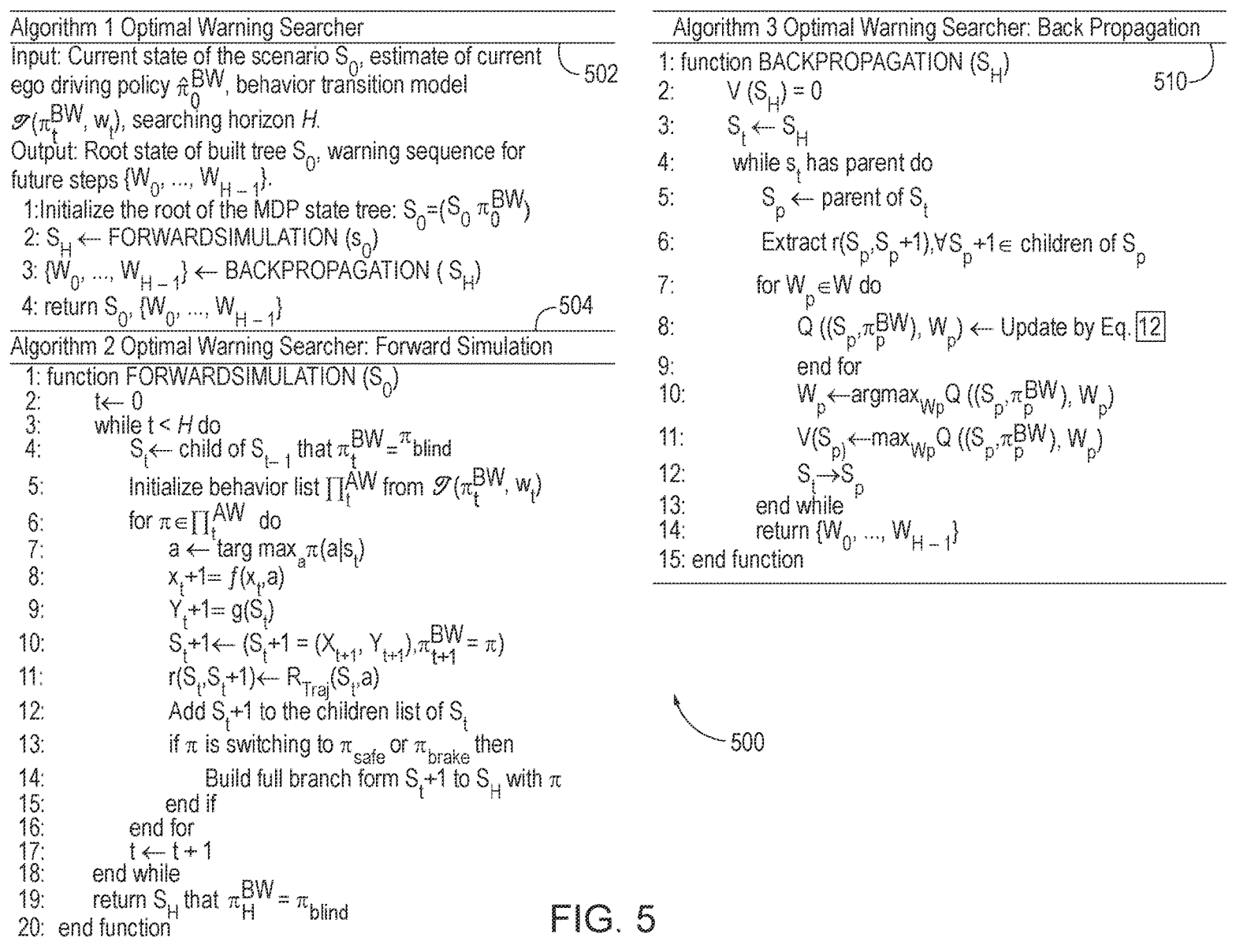

Algorithm 1 Optimal Warning Searcher $\qquad$ 502

Input: Current state of the scenario $S_0$; estimate of current ego driving policy $\hat{\pi}_0^{BW}$, behavior transition model $\mathcal{T}(\pi_t^{BW}, w_t)$, searching horizon $H$.

Output: Root state of built tree $S_0$; warning sequence for future steps $\{W_0, ..., W_{H-1}\}$.

1: Initialize the root of the MDP state tree: $S_0 = (S_0, \pi_0^{BW})$
2: $S_H \leftarrow$ FORWARDSIMULATION($s_0$)
3: $\{W_0, ..., W_{H-1}\} \leftarrow$ BACKPROPAGATION($S_H$)
4: return $S_0$, $\{W_0, ..., W_{H-1}\}$ $\qquad$ 504

Algorithm 2 Optimal Warning Searcher: Forward Simulation

1: function FORWARDSIMULATION($S_0$)
2: $t \leftarrow 0$
3: while $t < H$ do
4: $S_t \leftarrow$ child of $S_{t-1}$ that $\pi_t^{BW} = \pi_{blind}$
5: Initialize behavior list $\Pi_t^{AW}$ from $\mathcal{T}(\pi_t^{BW}, w_t)$
6: for $\pi \in \Pi_t^{AW}$ do
7: $a \leftarrow \arg\max_a \pi(a|s_t)$
8: $x_t+1 = f(x_t, a)$
9: $Y_t+1 = g(S_t)$
10: $S_t+1 \leftarrow (S_t+1 = (X_{t+1}, Y_{t+1}), \pi_{t+1}^{BW} = \pi)$
11: $r(S_t, S_t+1) \leftarrow R_{Traj}(S_t, a)$
12: Add $S_t+1$ to the children list of $S_t$
13: if $\pi$ is switching to $\pi_{safe}$ or $\pi_{brake}$ then
14: Build full branch form $S_t+1$ to $S_H$ with $\pi$
15: end if
16: end for
17: $t \leftarrow t+1$
18: end while
19: return $S_H$ that $\pi_H^{BW} = \pi_{blind}$
20: end function Algorithm 3 Optimal Warning Searcher: Back Propagation $\qquad$ 510

1: function BACKPROPAGATION($S_H$)
2: $V(S_H) = 0$
3: $S_t \leftarrow S_H$
4: while $s_t$ has parent do
5: $S_p \leftarrow$ parent of $S_t$
6: Extract $r(S_p, S_p+1), \forall S_p+1 \in$ children of $S_p$
7: for $W_p \in W$ do
8: $Q((S_p, \pi_p^{BW}), W_p) \leftarrow$ Update by Eq. [12]
9: end for
10: $W_p \leftarrow \arg\max_{W_p} Q((S_p, \pi_p^{BW}), W_p)$
11: $V(S_p) \leftarrow \max_{W_p} Q((S_p, \pi_p^{BW}), W_p)$
12: $S_t \rightarrow S_p$
13: end while
14: return $\{W_0, ..., W_{H-1}\}$
15: end function

TABLE II

TRAJECTORY REWARD IN CLOSED-LOOP EXPERIMENTS

| $d_{gap}(0)$ | Method | Average Trajectory Reward $R_{Traj}$ | |
| --- | --- | --- | --- |
| | | Front Hard Brake | Lane Change |
| 8.5m 700⟶ 702⟶ | Estimated State MDP | -1038.06 ± 7.08 | -1184.02 ± 0.28 |
| | Appr. POMDP | -1040.53 ± 17.14 | -1183.92 ± 0.19 |
| | TTC Baseline | -1307.50 ± 49.69 | -1411.25 ± 0.00 |
| | Rule-based Baseline | -1236.61 ± 109.50 | -1411.25 ± 0.00 |
| 13.5m 700⟶ 702⟶ | Estimated State MDP | -762.45 ± 35.54 | -806.56 ± 35.88 |
| | Appr. POMDP | -767.80 ± 46.17 | -857.77 ± 50.23 |
| | TTC Baseline | -1073.82 ± 38.44 | -1156.52 ± 64.95 |
| | Rule-based Baseline | -883.48 ± 83.61 | -948.64 ± 19.90 |
| 18.5m 700⟶ 702⟶ | Estimated State MDP | -632.48 ± 43.97 | -678.56 ± 30.18 |
| | Appr. POMDP | -628.06 ± 54.68 | -678.29 ± 40.41 |
| | TTC Baseline | -757.15 ± 39.40 | -873.34 ± 71.90 |
| | Rule-based Baseline | -648.32 ± 76.20 | -697.07 ± 72.60 |

TABLE III

CLOSED-LOOP WARNING EXPERIMENTAL RESULTS OF LANE CHANGE

| $d_{gap}(0)$ | Method | Average Count of Warning | | | |
| --- | --- | --- | --- | --- | --- |
| | | Text | Voice | Alarm | Take Over |
| 8.5m 700⟶ 702⟶ | Estimated State MDP | 0.00 | 1.00 | 1.00 | 0.00 |
| | Appr. POMDP | 0.00 | 1.00 | 1.07 | 0.00 |
| | TTC Baseline | 0.00 | 2.00 | 1.00 | 1.00 |
| | Rule-based Baseline | 0.00 | 0.00 | 4.00 | 0.00 |
| 13.5m 700⟶ 702⟶ | Estimated State MDP | 1.00 | 2.12 | 0.01 | 0.00 |
| | Appr. POMDP | 2.71 | 1.00 | 0.51 | 0.00 |
| | TTC Baseline | 1.67 | 0.93 | 0.94 | 0.67 |
| | Rule-based Baseline | 0.96 | 2.04 | 1.04 | 0.00 |
| 18.5m 700⟶ 702⟶ | Estimated State MDP | 0.00 | 2.10 | 0.01 | 0.00 |
| | Appr. POMDP | 0.99 | 1.12 | 0.13 | 0.00 |
| | TTC Baseline | 0.94 | 0.94 | 0.94 | 0.52 |
| | Rule-based Baseline | 3.66 | 1.47 | 0.01 | 0.00 |

1002
Generating the time-series data

1004
Recording control inputs by the driver

1010
Developing the driver behavior model

1012
Predicting the trajectories

1014
Generating the warning

1020
Predicting a future vehicle state

1022
Recording a present vehicle state associated with the control inputs

1024
Controlling the predetermined intensity of warnings

DRIVER WARNING SYSTEM

BACKGROUND

Road traffic plays an important role in people's lives. With the development of the complexity of city road networks in particular, it is crucial for an advanced driver assistance system to be able to alert a human driver to potential risks while driving a vehicle. Studies of human driver behavior show that existing driver warning technologies, mainly including forward collision warning systems and unsafe lane change warning systems, can reduce a risk of collision caused by human error.

However, studies show that the human drivers' reactions to warnings vary with different types of warnings and drivers. For example, studies indicate that driver age and years of driving experience, collision type, and warning type can affect driving performance. In this regard, most methods in relevant literature mainly generate warnings in a one-shot manner without modeling an ego driver's reactions and surrounding objects. Meanwhile, triggering conditions of generating warnings are mostly rule-based threshold-checking based on a current state of the vehicle, such as a time-to-collision (TTC) and the minimum safety distance. As a consequence, studies have emphasized the importance of executing smoother and more comfortable braking maneuvers to assist drivers in avoiding not only identified obstacles but also collisions with subsequent vehicles.

BRIEF DESCRIPTION

According to one aspect, a vehicle includes a ranged sensor that generates time-series data indicating positions of objects in an environment surrounding the vehicle, and a user interface configured to warn the driver of a predicted collision between the vehicle and one of the objects in the environment. The vehicle also includes at least one processor including an electronic control unit operatively connected to the ranged sensor and the user interface. The at least one processor records control inputs by the driver driving the vehicle, and develops a driver behavior model associated with the driver driving the vehicle based on the control inputs. The at least one processor also predicts trajectories of the objects and the vehicle based on the time-series data and the driver behavior model, and predicts a collision between the vehicle and one of the objects based on the predicted trajectories. The at least one processor also generates a warning indicating the predicted collision to the driver.

According to another aspect, a method for generating a warning to a driver of a vehicle includes generating time-series data indicating positions of objects in an environment surrounding the vehicle, and recording control inputs by the driver driving the vehicle. The method also includes developing a driver behavior model associated with the driver driving the vehicle based on the control inputs. The method also includes predicting trajectories of the objects and the vehicle based on the time-series data and the driver behavior model, and predicting a collision between the vehicle and one of the objects based on the predicted trajectories. The method also includes generating a warning indicating the predicted collision to the driver.

According to another aspect, a non-transitory computer readable storage medium stores instructions that, when executed by at least one processor, causes the at least one processor to perform a method. The method includes generating time-series data indicating positions of objects in an environment surrounding the vehicle, and recording control inputs by the driver driving the vehicle. The method also includes developing a driver behavior model associated with the driver driving the vehicle based on the control inputs. The method also includes predicting trajectories of the objects and the vehicle based on the time-series data and the driver behavior model, and predicting a collision between the vehicle and one of the objects based on the predicted trajectories. The method also includes generating a warning indicating the predicted collision to the driver.

BRIEF DESCRIPTION OF THE DRAWINGS

FIG. 1 is an exemplary operating environment of a vehicle.

FIG. 5 is an algorithm set.

FIG. 7 shows Table I and Table II, which summarize results from the simulation.

DETAILED DESCRIPTION

Figure 2:
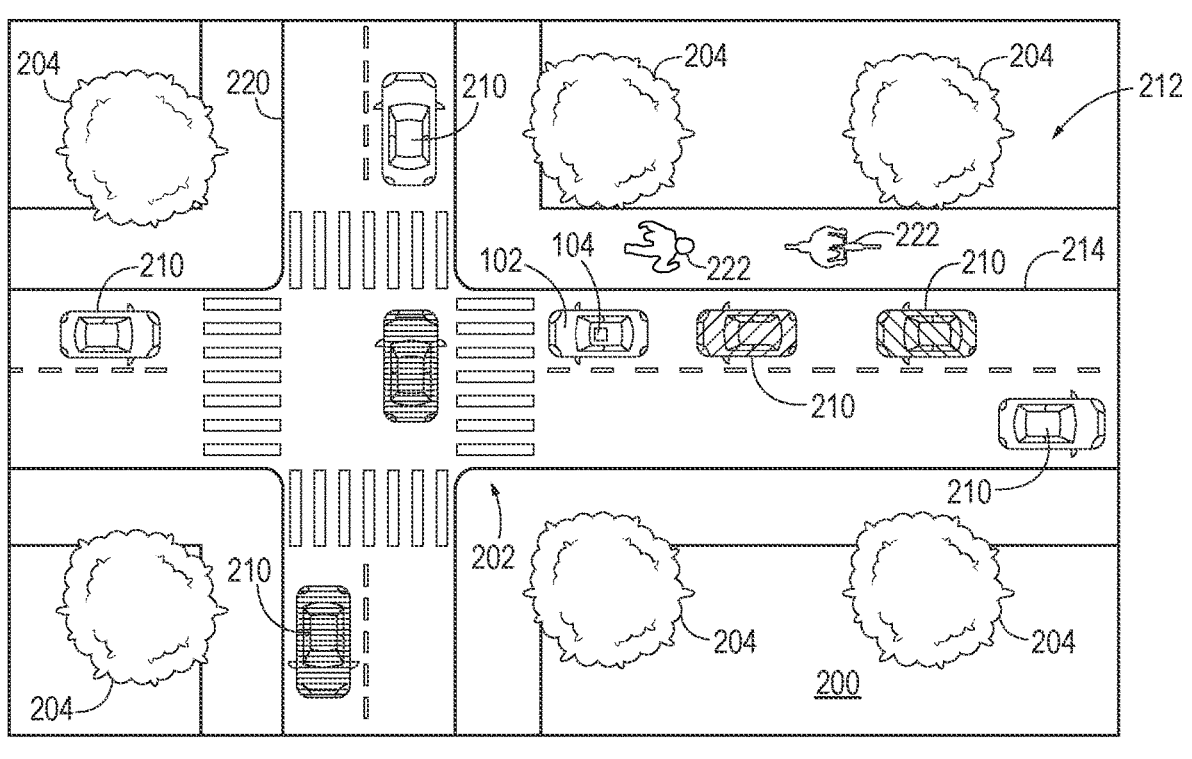
FIG. 2 is a top view of the vehicle in an environment.

The systems and methods disclosed herein include a learning framework configured to provide an advanced warning system that models driver behavior to predict collisions between a vehicle and an object in an environment surrounding the vehicle. The learning framework also adapts a predetermined intensity of warnings generated by the advanced warning system based on modeled driver behavior when a recorded present vehicle state matches a predicted future vehicle state. A vehicle including the disclosed systems may perform advanced warnings to a driver based on the model driver behavior, and adapt a warning system to the modeled driver behavior.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user in a surrounding environment.

System Overview

Referring now to the drawings, the drawings are for purposes of illustrating one or more exemplary embodiments and not for purposes of limiting the same. FIG. 1 is an exemplary component diagram of an operating environment 100 of a vehicle 102 including a ranged sensor 104, a brake mechanism 110, an accelerator mechanism 112, a steering control 114, a user interface 120, and a computing device 122. While, as depicted, the vehicle 102 is a car, the vehicle 102 may alternatively be a truck, scooter, moped, motorcycle, mobility device, or other user-actuated vehicle configured for navigating traffic without departing from the scope of the present disclosure.

Each of the ranged sensor 104, the brake mechanism 110, the accelerator mechanism 112, the steering control 114, the user interface 120, and the computing device 122 may be interconnected by a bus 124. The components of the operating environment 100, as well as the components of other systems, hardware architectures, and software architectures discussed herein, may be combined, omitted, or organized into different architectures for various embodiments.

The computing device 122 is implemented as a part of the vehicle 102 as an electronic control unit (ECU), and connected to an external server 130 via a network 132. The computing device 122, as the ECU, is operatively connected to the ranged sensor 104, the brake mechanism 110, the accelerator mechanism 112, the steering control 114, and the user interface 120.

The computing device 122 may be capable of providing wired or wireless computer communications utilizing various protocols to send and receive electronic signals internally to and from components of the operating environment 100. Additionally, the computing device 122 may be operably connected for internal computer communication via the bus 124 (e.g., a Controller Area Network (CAN) or a Local Interconnect Network (LIN) protocol bus) to facilitate data input and output between the computing device 122 and the components of the operating environment 100.

The computing device 122 includes a processor 134, a memory 140, a data store 142, and a communication interface 144, which are each operably connected for computer communication via the bus 124. The communication interface 144 provides software and hardware to facilitate data input and output between the components of the computing device 122 and other components, networks, and data sources described herein.

The user interface 120 is configured to warn a driver of the vehicle 102 of a predicted collision between the vehicle 102 and one of the objects 202 in the environment 200, including the other vehicles 210. In this regard, the user interface 120 may include a speaker 150 configured to generate an audio output to the driver of the vehicle 102 as part of a warning, and a display 152 configured to generate a visual driver as part of the warning. The speaker 150 and the display 152 may be configured in the vehicle 102 as components of a heads-up display, a dashboard, a speaker system, a mirror display, a center console, or other portion of the vehicle 102 configured to alert the driver without departing from the scope of the present disclosure.

As shown in FIG. 2, the ranged sensor 104 is configured to generate time-series data of an environment 200 surrounding the vehicle 102 and transmit the time-series data to the computing device 122. The time-series data generated by the ranged sensor 104 indicates positions of objects 202 in the environment 200 with respect to the vehicle 102.

The objects 202 include trees 204 and other stationary objects detected by the vehicle 102 in the environment 200. The objects 202 also include other vehicles 210 on a road network 212 having a first road 214 occupied by the vehicle 102, and a second road 220 intersecting the first road 214. The objects 202 also include pedestrians and cyclists 222 traveling in proximity to the road network 212, and capable of traveling into or across the road network 212.

The ranged sensor 104 may include a combination of optical, infrared, or other cameras for generating the time-series data of the objects 202. The ranged sensor 104 may additionally or alternatively include light detection and ranging (LiDAR) systems, position sensors, proximity sensors, microphones, and a variety of other sensors and sensor combinations for generating the time-series data in a manner similar to known systems, including systems provided in vehicles for detecting other vehicles at a distance, and therefore will not be described in detail.

Figure 3:
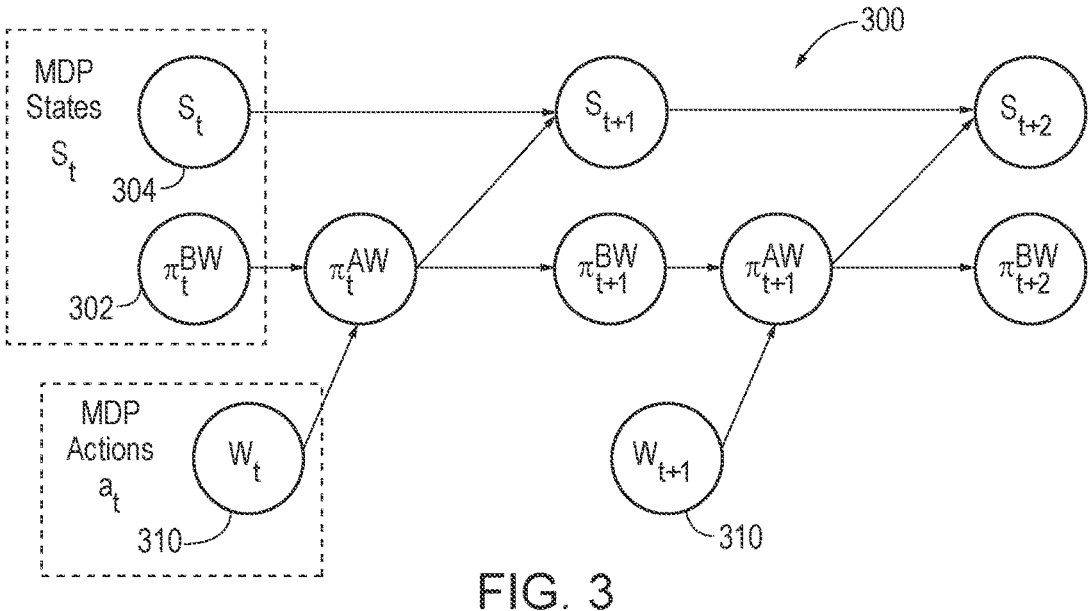
FIG. 3 is a diagram of a learning framework.

FIG. 3 depicts a learning framework 300 that incorporates the vehicle 102. To provide accurate warning information to the driver of the vehicle 102, the computing device 122 develops a driver behavior model 302 describing ego driving behavior, which can be represented by a driving policy $\pi(a|s_t)$. Here, a denotes the driver's action as control inputs including an acceleration input through the acceleration mechanism 112, and a steering angle input through the steering control 114. In this manner, the computing device 122 records a state of the vehicle 102 and control inputs by the driver driving the vehicle 102. The computing device 122 also develops the driver behavior model 302 associated with the driver driving the vehicle 102 based on the control inputs and a recorded present vehicle state associated with the control inputs.

The computing device 122 may additionally or alternatively develop the driver behavior model 302 using control inputs from the brake mechanism 110 and the user interface 120 without departing from the scope of the present disclosure. $s_t$ represents a current scenario state 304, including a present vehicle state, ego dynamic states and its history $x_t$, all N surrounding agents' dynamic states and their history $Y_t=\{y_t, \ldots, y_t\}$, and any other environment information, such as map information. Also, $w_t$ represents a warning 310 generated through the user interface 120. The warning 310 indicates a potential danger, particularly a predicted collision between the vehicle 102 and at least one of the objects 202 in the environment 200 based on predicted trajectories.

Figure 4:
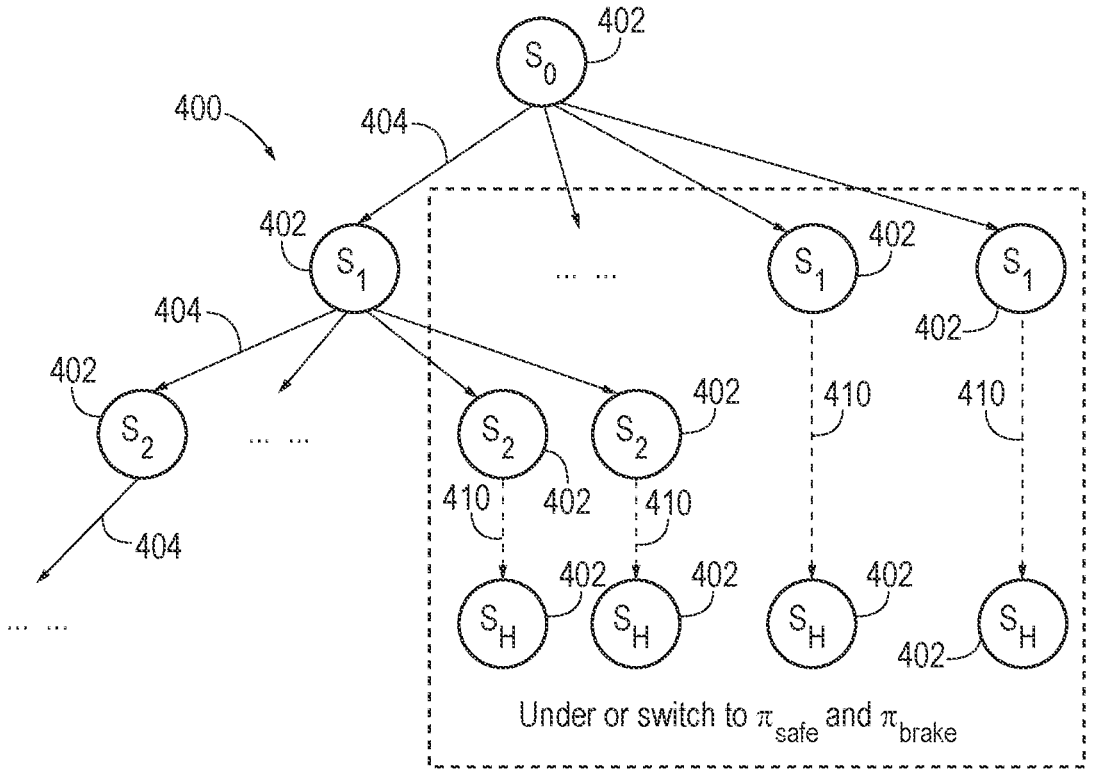
FIG. 4 is a diagram of a Markov decision process (MDP) state tree supported by the learning framework.

FIG. 4 depicts Table I, which models the driver behavior model 302 into four different modes. Before the warning 310 is provided, the ego driver may already notice a given danger and drive safely considering all other agents. The ego driving behavior under this mode is denoted by $\pi_{safe}$ ($a|s_t=(x_t, Y_t)$).

Meanwhile, the ego driver can also be distracted and break attention from the objects 202 in the environment, under which the policy can be denoted as $\pi_{blind}(a|s_t)$. Even though the driver is presumed to be inattentive under $\pi_{blind}$, the driving behavior should still follow the human driving properties. Thus, $\pi_{blind}$ may be derived from $\pi_{safe}$ by masking out $Y_t$, as shown in the following equation (1):

$$\pi_{blind}(a|s_t) = \pi_{safe}(a|s_t = (x_t, \emptyset)) \quad (1)$$

After the warning $w_t$, the computing device 122 may determine that sometimes the driver tends to decelerate immediately before really considering the scene and optimizing their actions. The action policy on this mode is denoted by $\pi_{brake}(T_R)(a|s_t)$.

Under this policy, as represented by the following equation (2), the ego driver will take brake action for $T_R$ time, and recover to $\pi_{safe}$ after that:

$$\pi_{brake}(T_R)(a|s_t) = \begin{cases} a_{decelerate}, & t < T_R \\ \pi_{safe}(a|s_t = (x_t, Y_t)), & t \geq T_R \end{cases} \quad (2)$$

With reference to equation (2) above, $a_{decelerate}$ is a fixed action that has negative acceleration, and $T_R$ is a fixed parameter as it is a feature of an individual. Notably, $\pi_{brake}$ is always a sub-optimal compared with $\pi_{safe}$ as its action space during $T_R$ is a subset of $\pi_{safe}$.

In addition to the above-noted driver considerations, human drivers also require a nonzero reaction time to begin to react to the warning $w_t$. To describe this behavior, we define the delay policy $\pi_{delay}(\pi_b, \pi_a, T_D)(a|s_t)$. When driving with this policy, the ego driver will follow $\pi_b$ for $T_D$ time and switch to $\pi_a$ after that, where $\pi_b$ and $\pi_a$ can be any driving policies except $\pi_{delay}$ itself, as shown in the following equation (3):

$$\pi_{delay}(\pi_b, \pi_a, T_D)(a|s_t) = \begin{cases} \pi_b(a|s_t), & t < T_D \\ \pi_a(a|s_t), & t \geq T_D \end{cases} \quad (3)$$

Similarly, $T_D$ is considered fixed over different combinations of behaviors, as it is a feature of an individual. In this regard, such behaviors can be obtained through different methods, such as data-driven methods and model-based methods, without departing from the scope of the present disclosure.

After providing the warning $w_t$, there is a chance that the driver doesn't notice the warning $w_t$ and doesn't react to the warning $w_t$. Meanwhile, the different intensities of the warning $w_t$ can make drivers react in different ways. The following equation (4) describes modeling a behavior transition of the driver:

$$\mathcal{T}(\pi_t, w_t) = Pr(\pi|\pi_t, w_t) \quad (4)$$

Equation (4) above represents a probability of the driving policy $\pi_t$ switching to another policy $\pi$ after receiving the warning $w_t \in W$, where $W=\{$No warning, Text, Voice, Alarm, Take over$\}$ is the set of possible warnings that can be provided to the driver. This model may be obtained through the human drivers' data, including the control inputs.

When the scenario is extremely dangerous and the system decides to take over the control to force the vehicle 102 to slow down, the driving policy will switch to $\pi_{brake}$ immediately without any delay. Meanwhile, as $\pi_{brake}$ is a more cautious behavior than $\pi_{safe}$, any warning can only transform $\pi_{safe}$ to $\pi_{brake}$ but not the opposite direction.

Referring back to FIG. 3, the learning framework 300 is a partially observed Markov decision process (MDP) adapted to formulate a warning generation problem. With the modeling of the ego driving behavior and its transition, the warning generation problem can be discretized as a MDP problem.

The state 304 of the MDP $s_t$ includes the state of the scenario $s_t$ and driver behavior model 302 before the warning $$\pi_t^{BW};$$

and the action 310 of the MDP $a_t$ is the warning $w_t$ provided to the ego diver, represented as the following set of equations (5):

$$s_t = (s_t, \pi_t^{BW}), \quad (5)$$
$$a_t = w_t$$

During the MDP state transition, the ego driving policy after the warning $$\pi_t^{AW}$$

will be decided first following the behavior transition model $$\mathcal{T}(\pi_t^{BW}, w_t).$$

Then, the policy will produce the driver's action and move the ego dynamic state to the next step through the dynamic.

Meanwhile, the surrounding agents will also decide their actions based on the current scenario state. As the step time between the two states is small enough, it may be assumed that the driving policy at the next step before the warning is the same as the driving policy at the current step after the warning. Thus, the whole state transition process of the learning framework 300 MDP can be summarized as:

$$\pi_t^{AW} \sim \mathcal{T}(\pi_t^{BW}, w_t), \tag{6}$$

$$a_t \sim \pi_t^{AW}(a|s_t),$$

$$x_{t+1} = f(x_t, a_t),$$

$$Y_{t+1} = g(s_t),$$

$$\pi_{t+1}^{BW} = \pi_t^{AW},$$

Here, g represents the behavior and dynamic of surrounding agents, which can be obtained through different existing trajectory prediction methods. The reward of the learning framework 300 MDP $R(s_t, w_t)$ contains two aspects: a trajectory reward $R_{traj}(s_t, a_t)$ and a cost of warning action $R_{warning}(s_t, w_t)$. The trajectory reward quantifies a safety and comfort of the trajectory, an efficiency of the driving action, and a tendency to follow the desired velocity, while the cost of warning action quantifies a predetermined intensity of the warning 310. For example, an audible alarm warning is more severe and discomforts the driver as compared to a text message warning. Where H denotes a searching horizon, an optimization problem to be solved can then be written as the following expression (7:

$$\max_{w_0, \dots, w_H} E\left[\sum_{t=0}^{H} Y^t R(s_t, w_t)\right], \tag{7}$$

$$\text{s.t. (6)}$$

$$s_t = \left(s_t, \pi_t^{BW}\right)$$

is the state of the MDP with the above expression (7), and Y is a discount factor. In general, the current ego driving behavior $$\pi_t^{BW}$$

is unknown, which makes the problem become a partially observed MDP. In this manner, the computing device 122 predicts trajectories of the objects 202 and the vehicle 102 based on the time-series data and the driver behavior model 302. The computing device 122 is also configured to predict a collision between the vehicle 102 and one of the objects 202 based on the predicted trajectories.

As noted above, the current scenario states $s_t$ as well as the driver's actions $a_t$ are determined through sensors in the vehicle 102, including the ranged sensor 104, the brake mechanism 110, the acceleration mechanism 112, the steering control 114, and the user interface 120. In an embodiment, the vehicle 102 includes interior sensors to additionally or alternatively record actions $a_t$ by the driver in the vehicle 102. As such, the ego driver's behavior may be estimated through the state measurements and driver's actions $a_t$ by Bayesian inference. Notably, while the depicted embodiment employs a Bayesian inference to probability distributions, the computing device 122 may employ additional or alternative statistical inferences of the state measurements and driver actions $a_t$.

The estimation of the ego driver's behavior may be computed with three steps: model prediction, observation correction, and state transition. These steps compose an adaptive design, and may incorporate additional observations of driving behavior like head pose and gaze. In this manner, the MDP formulation disclosed herein is flexible for incorporating a variety of inputs from the driver and sensors in the vehicle 102 for determining the driver behavior $\pi$.

Regarding model prediction, Let $$b\left(\pi_t^{BW}\right)$$

denote the estimated behavior distribution, and $$b\left(\pi_0^{BW}\right)$$

be the initial estimated distribution. After receiving the warning, the estimation will be updated with the model, as represented by the following equation (8):

$$b^-\left(\pi_t^{AW}\right) = \sum_{\pi \in \Pi} \mathcal{T}(\pi, w_t) b\left(\pi_t^{BW} = \pi\right) \tag{8}$$

With reference to the above equation (8), $$b^-\left(\pi_t^{AW}\right)$$

is the estimated distribution after the model prediction step, and $\Pi$ is a set that contains all possible driving policies. Regarding observation correction, after the ego driver takes an action $a_t$, the estimated behavior will be updated through the Bayesian inference, as represented by the following equation (9):

$$b^+\left(\pi_t^{AW} = \pi\right) = \frac{\pi(a_t|s_t) \times b^-\left(\pi_t^{AW} = \pi\right)}{\sum_{\pi \in \Pi} \pi(a_t|s_t) \times b^-\left(\pi_t^{AW} = \pi\right)} \tag{9}$$

With reference to the above equation (9), $$b^+\left(\pi_t^{AW}\right)$$

is the estimated distribution after the observation correction step. Based on the state transition modeling in the equation set (6), the estimated distribution of the behavior at the next step before the warning $w_t$ can be obtained by the following equation (10):

$$b\left(\pi_{t+1}^{BW}\right) = b^-\left(\pi_t^{AW}\right) \tag{10}$$

Notably, for behavior $\pi_{brake}$ and $\pi_{delay}$ that have internal behavior transitions, such transitions may happen as time passes and will be captured during this state transition update step.

With the estimated behavior distribution, the problem can be solved either through the MDP formulation which utilizes the most probable behavior from estimation, or partially observed MDP which considers the whole estimated distribution and solves the optimization over the belief space. The following disclosure provides two different approximated solutions to the partially observed MDP problem, which require fewer computational resources for similar effect as an exact solution to the partially observed MDP problem.

After acquiring the estimated behavior distribution, an estimate may be extracted from the distribution as an estimated state to solve the problem as a MDP. The behavior estimates are generated by the following equation (11):

$$\hat{\pi}_t^{BW} = \begin{cases} \pi_{blind}, \, b(\pi_t^{BW} = \pi_{blind}) > Th_{safety} \\ \text{argmax}_\pi b(\pi_t^{BW} = \pi), \text{ otherwise} \end{cases} \quad (11)$$

With reference to the above equation (11), $$\hat{\pi}_t^{BW}$$

is the extracted estimates at time step t, and $Th_{safety}$ is a safety threshold to satisfy the robustness and safety requirement of the warning system. By considering $$\hat{\pi}_t^{BW}$$

as an estimated state, the problem may be solved by estimating a corresponding Bellman equation. Based on the modeling presented above, a probability transition function referred to herein as the Q-function can be represented as the following equation set (12):

$$Q(s_t, a_t) = Q((s_t, \pi_t^{BW},) w_t) = R_{warning}(w_t) + E_{(*)} R_{Traj}(s_t, a_t) \quad (12)$$

$$V^*(s_t) = V^*((s_t, \pi_t^{BW})) = \underset{w_t}{\max Q}((s_t, \pi_t^{BW}), w_t)$$

$$(*): \pi_t^{AW} \sim \mathcal{T}(\pi_t^{BW}, w_t), a_t \sim \pi_t^{AW}(a|s_t)$$

FIG. 4 depicts a MDP state tree 400 after a simplification rule is applied. Each node 402 in the tree 400 represents a MDP state $s_t$. Each edge 404 connecting the nodes 402 represents a possible state transition. The nodes 402 connected by the edges 404 form branches 410 depending from the current scenario state 304, represented as $s_0$. Nodes 402 depending from the current scenario state 304, represented as $s_1, s_2, \ldots, s_H$, indicate subsequent scenario states, including predicted future vehicle states of the vehicle 102. The nodes 402 positioned within a box 412 indicate a predicted MDP state $s_t$ in which the driver noticed the warning $w_t$. The nodes 402 positioned outside the box 412 indicate a predicted MDP state $s_t$ in which the driver did not notice the warning $w_t$. The computing device 122 determines whether the driver noticed the generated warning $w_t$ based on the present vehicle state matching a future vehicle state that corresponds to one of the nodes 402.

By discretization of actions using the equation set (12), the development of the states can be formed as the tree 400. Based on the tree 400, a search algorithm set 500 shown in FIG. 5 may estimate a Q-value in the equation set (12) of each action at each state. The algorithm set 500 contains two phases: forward simulation and back propagation. The algorithm set 500 includes a first algorithm 502, a second algorithm 504 that performs forward simulation, and a third algorithm 510 that performs back propagation. The first algorithm 502 is an optimal warning searcher algorithm that organizes performance by the second algorithm 504 and the third algorithm 510 in the algorithm set 500.

During the forward simulation by the algorithm set 500, the tree 400 will be constructed from the current scenario state $s_t$ with driving actions $a_t$ with maximum probability from the different driving policies. Even though the driving actions $a_t$ are simplified, the states will still develop exponentially and become intractable after several time steps.

Referring back to FIG. 4, to reduce a dimension of the tree 400, the branches 410 within the box 412 are simplified to indicate that ego driving behavior $\pi s$ under or switching to $\pi_{safe}$ and $\pi_{brake}$, which correspond to the driver having noticed and responded to the warning $w_t$. For those branches 410 within the box 412, the warning provided to the driver is fixed to $w_t$=no warning. Therefore, for those branches 410 within the box 412, the algorithm set 500 will roll out to an end and return the Q-value immediately, which reduces the tree width over searching depth from exponential increasing to linear increasing, as shown in FIG. 4.

In this manner, the computing device 122 predicts future vehicle states based on the driver behavior model 302 and the current scenario state 304, including the present vehicle state. The future vehicle states occur after generating the warning $w_t$, where nodes 402 located outside the box 412 indicate that the driver noticed the warning $w_t$, and the nodes 402 located outside the box 412 indicate that the driver did not notice the warning $w_t$. The computing device 122 records the present vehicle state, and controls the predetermined intensity of warnings $w_t$ by the user interface 120 based on whether the driver noticed a generated warning $w_t$, i.e. when a present vehicle state matches the future vehicle state corresponding to one of the nodes 402. More specifically, the computing device increases the predetermined intensity of the warnings $w_t$ when the present vehicle state matches a future vehicle state corresponding to a node 402 located outside the box 412, and reduces the predetermined intensity when the present vehicle state matches a future vehicle state corresponding to a node 402 located inside the box 412. Controlling the predetermined intensity of the warnings $w_t$ may include adjusting the safety threshold $Th_{safety}$, a duration of time during which the warnings $w_t$ are generated, a number of times the warnings $w_t$ are generated during a period of time before the predicted collision, incorporating at least one of an audio output and a visual output to the warning, and adjusting an intensity of at least one of the audio output and the visual output. The intensity of the audio output may be determined in decibels, and the intensity of the visual output may be determined in lumens. The intensity of the audio output and the visual output may additionally or alternatively correspond to substance of a message indicated to the driver, and a number or configuration of lights or speakers employed by the user interface 120 in generating the warning $w_t$.

When the computing device 122 determines the present vehicle state matches a future vehicle state corresponding to a node 402 located outside the box 412, the computing device 122 increases the predetermined intensity of the warning $w_t$ to gain attention by the driver. When the computing device 122 determines the present vehicle state matches a future vehicle state corresponding to a node 402 located inside the box 412, the computing device 122 maintains or reduces the predetermined intensity of the warnings $w_t$ to improve driver comfort.

With this construction, the computing device 122 predicts first future vehicle states, represented as scenario states $s_1$ based on the driver model $\pi$, where the first future vehicle states occur after generating the warning $w_1$, and indicate whether the driver noticed the warning $w_1$. The computing device 122 also predicts second future vehicle states, represented as scenario states $s_2$ that are each subsequent to, and depend from one of the first future vehicle states $s_1$. In an embodiment, the computing device 122 controls a predetermined intensity of warnings $w_t$ by the user interface 120 when the present vehicle state matches one of the first future vehicle states, and then matches one of the second future vehicle states subsequent to the first future vehicle state.

The computing device 122 follows the above-described process continuously to a time horizon H corresponding to predicted trajectories of the vehicle 102 and the objects 202. In this regard, the computing device 122 predicts iterations of subsequent future vehicle states, including the second future vehicle states, to the time horizon H, where the iterations of subsequent future vehicle states each depend from one of the first future vehicle states or an intermediate iteration of subsequent future vehicle states, and indicate whether the driver noticed the warning $w_t$. The computing device 122 further controls the predetermined intensity of warnings $w_t$ by the user interface 120 when the present vehicle state matches one of the first future vehicle states, and then matches a plurality of the iterations of subsequent future vehicle states that depend from the matched future vehicle state.

As discussed above, $\pi_{safe}$ and $\pi_{brake}$ are policies that will decide the driving actions while considering all the other agents. The $\pi_{brake}$ policy is always sub-optimal compared with $\pi_{safe}$ and can not be transformed to $\pi_{safe}$ through the warning $w_t$. Thus, as long as these behaviors are able to produce a collision-free trajectory after the delay, there is no need for a further warning $w_t$. When the delay of reaction makes $\pi_{safe}$ and $\pi_{brake}$ fail to produce a feasible trajectory, only taking over the control of the vehicle can handle the scenario. Under this case, the taking over can be applied at an early step or late step based on incorporated rewards. For safety considerations, taking over earlier may be applied so that the ego driver has more time and space to react. Thus, in an embodiment, when the vehicle 102 otherwise determines that the policies will fail due to the delay, the vehicle applies taking over directly.

During the back propagation by the algorithm set 500, the estimated Q-value is computed backward from the nodes 402. In the meantime, the algorithm set 500 will also select the best predetermined intensity of each warning $w_t$ to be provided at each time step. After propagating to a root node 402, the algorithm set 500 has updated all Q-values and is able to return a warning sequence for future steps when the ego driver does not notice the warning.

For approximated partially observed MDP, the estimated state ignores uncertainty, and utilizes the safety threshold $Th_{safety}$ to reduce the error brought by overconfident estimates. Another approximation method is performed by solving the warning with the maximum expected Q-value over the estimated behavior distribution. The formulation can be represented as the following expression (13):

$$\max_{w_0} E_{\pi^{BW} \sim b(\pi_0^{BW})}[Q((s_0,\pi^{BW}),w_0)] \tag{13}$$

With reference to the above expression (13), each Q-value $Q((s_0,\pi^{BW}),w_0)$ can be obtained through a same algorithm for the MDP with an estimated state.

In the above-described manner, the computing device 122 repeatedly records the control inputs by the driver driving the vehicle 102, and a present vehicle state associated with the control inputs. The computing device 122 further repeatedly develops the driver behavior model T associated with the driver driving the vehicle 102 based on the control inputs and the present vehicle state. The computing device 122 further repeatedly predicts the trajectories of the objects 202 and the vehicle 102 based on the time-series data and the driver behavior model r, and predicts a collision between the vehicle 102 and one of the objects 202 based on the predicted trajectories. The computing device 122 further repeatedly generates a warning $w_t$ indicating the predicted collision to the driver, where the warning $w_t$ has a predetermined intensity. The computing device 122 further repeatedly predicts future vehicle states based on the driver model $\pi$ and a most recently generated warning $w_t$. The computing device 122 further repeatedly adjusts the predetermined intensity of the warning $w_t$ when the present vehicle state matches one of the future vehicle states.

In this regard, in initial iterations of the method applied by the learning framework 300 in the vehicle 102, the control inputs are first control inputs, the driver behavior model $\pi$ is a first driver behavior model $\pi_0$, the predicted collision is a first predicted collision, and the warning $w_t$ is a first warning $w_0$ with an initial predetermined intensity. After generating the first warning $w_0$, the computing device 122 records second control inputs by the driver driving the vehicle 102, develops a second driver behavior $\pi_1$ model associated with the driver driving the vehicle 102 based on the second control inputs. The computing device 122 further predicts trajectories of the objects 202 and the vehicle 102 based on the time-series data and the second driver behavior model $\pi_1$, and predicts a collision between the vehicle 102 and one of the objects 202 based on the predicted trajectories. The computing device 122 further generates a second warning $w_1$ indicating the predicted collision to the driver.

Figures 6A, 6B:
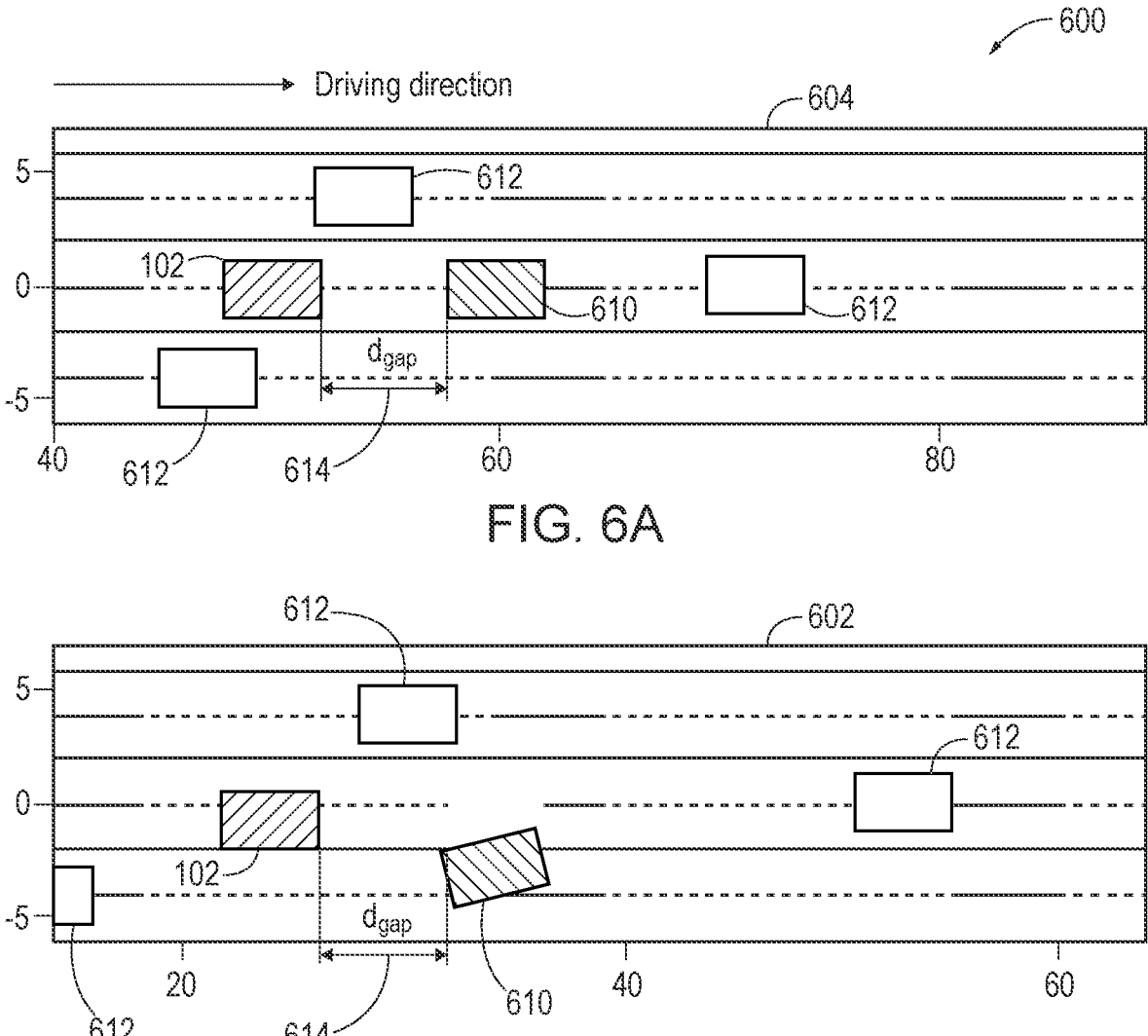
FIG. 6A is a simulation of the vehicle supported by the learning framework in a hard braked front vehicle scenario.
FIG. 6B is a simulation of the vehicle supported by the learning framework in a lane change scenario.

Experiments were conducted on an exemplary embodiment of the vehicle 102 in a simulation 600 depicted in FIGS. 6A and 6B. FIG. 6A depicts the vehicle 102 in a hard braked front vehicle scenario, and FIG. 6B depicts the vehicle 102 in a lane change scenario. With continued reference to FIGS. 6A and 6B, the simulation 600 was conducted with a focus on scenarios dangerous to the driver of the vehicle 102, including lane change scenarios 602 and hard braked front vehicle scenarios 604.

In the simulation 600, the learning framework 300 is applied to the vehicle 102 as the ego vehicle whose initial driving policy is $\pi_{blind}$. The simulation 600 includes an active dangerous vehicle 610 with some background vehicles 612, which will cause danger and collisions if the driver of the vehicle 102 does not change their behavior. Here, $d_{gap}$ represents a gap 614 between the vehicle 102 and the active dangerous vehicle 610. The experiments in the simulation 600 were conducted over different initial $d_{gap}$, while the driver behavior $\pi$s simulated by an IDM model with parameters fitting from real-world data.

FIG. 7 shows Table I and Table II, which indicate results from the simulation 600. As shown in FIG. 7, performance by the learning framework 300 is compared with a classical Time to Collision (TTC) based warning system 700, in which the warning is decided based on a TTC threshold. In this manner, the TTC based warning system 700 is a baseline in the simulation 600. The simulation 600 also includes an adaptive rule-based warning generator 702 as a second baseline to the TTC based warning system 700. This baseline method utilizes a speed and a gap between the vehicles to compute the minimum gap $d_{min}$, assuming a hard braking happened. Here, $v_{front}$ and $v_{ego}$ denote a longitudinal speed of the active dangerous vehicle 610 and the vehicle 102 respectively. Also, $acc_{min}$ represents a minimum acceleration vehicles in the simulation 600 can achieve. Thus, the computation can be summarized as the following equation set (14):

$$d_{front} = \frac{v_{front}^2}{2|acc_{min}|}$$ (14)

$$d_{ego} = v_{ego}T_D + \frac{v_{ego}^2}{2|acc_{min}|}$$

$$d_{min} = d_{gap} + d_{front} - d_{ego}$$

With reference to the equation set (14) above, $d_{front}$ and $d_{ego}$ respectively represent a distance that the active dangerous vehicle 610 and the vehicle 102 will travel when doing hard braking. Then, the warning $w_t$ can be generated by evaluating the following inequality (15):

$$d_{min} \leq -\alpha_w v_{ego}T_D$$ (15)

With reference to the inequality (15) above, $\alpha_w$ is a parameter varying with the severeness of a warning. When $\alpha_w = 1$, it represents the condition for the vehicle 102 to take over the control, which may be represented by the following inequality (16):

$$d_{gap} + \frac{v_{front}^2}{2|acc_{min}|} - \frac{v_{ego}^2}{2|acc_{min}|} \leq 0$$ (16)

The left half of the inequality (16) above represents the minimum gap when the vehicle 102 takes over the control to conduct a hard brake without delay. The above conditions prevent the vehicle 102 from entering this dangerous zone.

The learning framework chooses the predetermined intensity of the warning $w_t$ based on the trajectory reward $R_{traj}$ and the cost of warning action $R_{warning}$. In the experiments, $R_{traj}$ may be defined by the following equation (17):

$$R_{Traj}(s_t, a_t) = -w_v(v_t - v_{desire})^2 - w_{acc}acc_t^2 - I(s_t)$$ (17)

With reference to the above equation (17), $v_t$ and $acc_t$ are the longitudinal velocity and acceleration of the vehicle 102 respectively. $v_{desire}$ denotes the desired longitudinal velocity of the vehicle. $I(s_t)$ is an indicator function that will return infinity when a collision happens and zero otherwise. Also, $w_v$ and $w_{acc}$ are parameters to balance the weight of velocity and acceleration. During the experiments, $w_v=0.5$, $w_{acc}=0.1$, $v_{desire}=11$ m/s. The cost of warning action $R_{warning}$ describes the severeness, i.e. the predetermined intensity of the warning $w_t$. During the experiments, $R_{warning}(w_t)$ is defined as {No warning: 0, Text: −1, Voice: −20, Alarm: −50, Take over: −108}. The cost of taking over the control is set to large so that it will be only applied when other actions are infeasible.

To focus the experiments on the learning framework 300, during the simulation 600, the prediction model is assumed to be effective enough to capture the accurate trajectories of surrounding agents. The result of each scenario is computed over 8-second long trajectories and averaged over 200 simulations.

The step horizon of the warning generation H is 10 while the duration of each time step is 0.5 second. Thus, the vehicle 102 will simulate 5 seconds into the future to provide the warning $w_t$. During the experiment, the warning search is run every 0.5 seconds, in a model predictive control manner.

Figure 8:
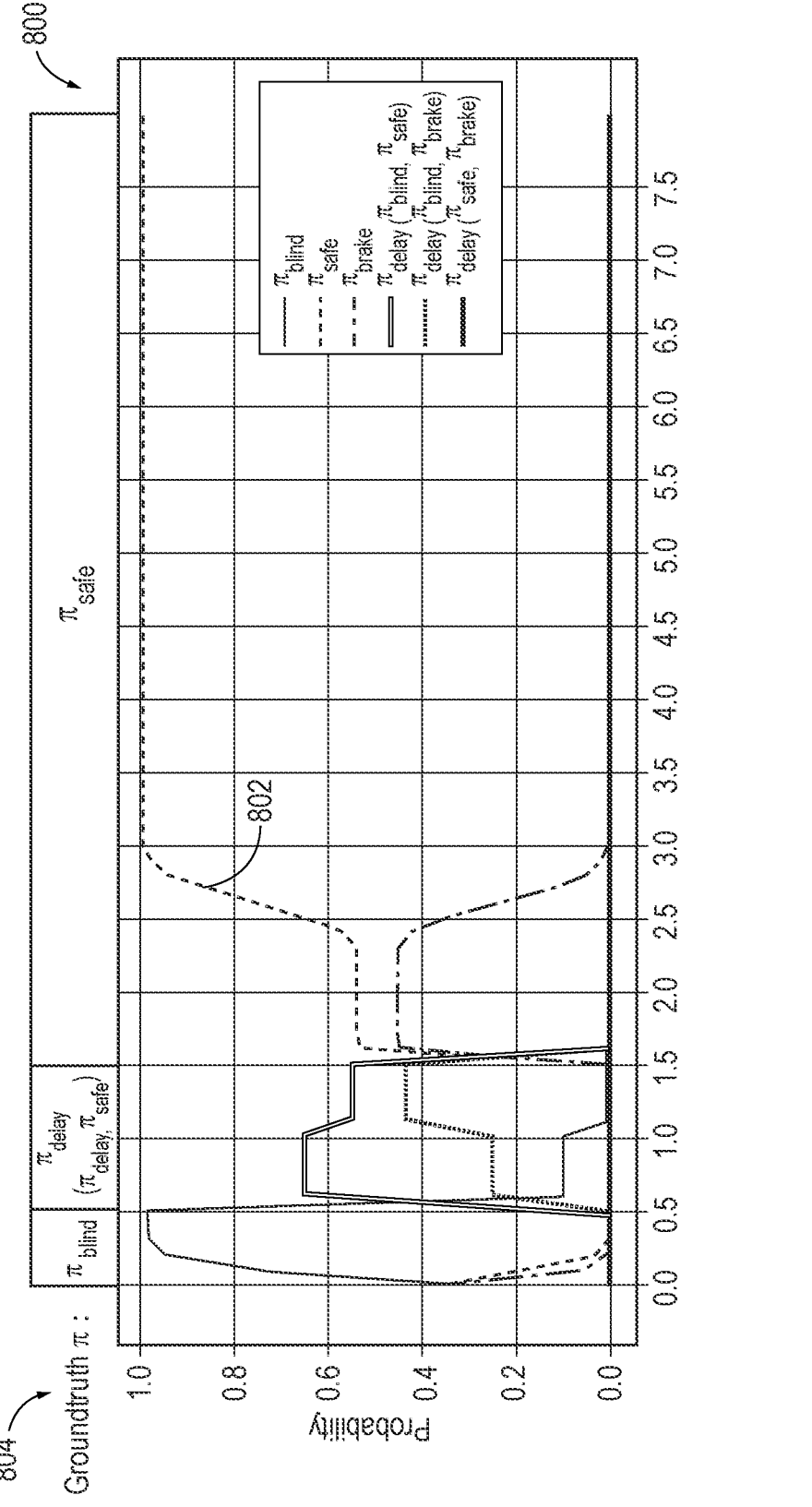
FIG. 8 is a plot depicting results from the simulation with respect to driver behavior model development.

FIG. 8 is a plot 800 of results of the simulation 600 with respect to a behavior transition of the driver of the vehicle 102, where the estimated distribution 802 is plotted at each time step. A ground truth 804 of current behavior $\pi$ is shown at the top of the plot 600. Two voice warnings $w_t$ are provided at 0.5 s and 1 s. As shown in FIG. 8, the behavior estimation model supported by the learning framework 300 is able to capture the correct current behavior.

Notably, when the vehicle 102 switches its behavior with a delay, there is less information in the observed action $\alpha_t$ as the actual driving policy has not changed. Therefore, the estimation relies on the model prediction step as shown with the curve during 0 to 1.5 seconds. After the delay time, the policy can be identified through the action with the observation correction step since the $\pi_{blind}$ will not react to the danger as shown with the curve during 1.5 to 3.0 second.

To evaluate performance by the vehicle 102 with the learning framework 300, the reward of the closed-loop trajectories in both scenarios are compared. As shown in Table I in FIG. 7, the learning framework 300 consistently achieves higher trajectory rewards than baselines in both scenarios over different initial $d_{gap}$.

Figure 9:
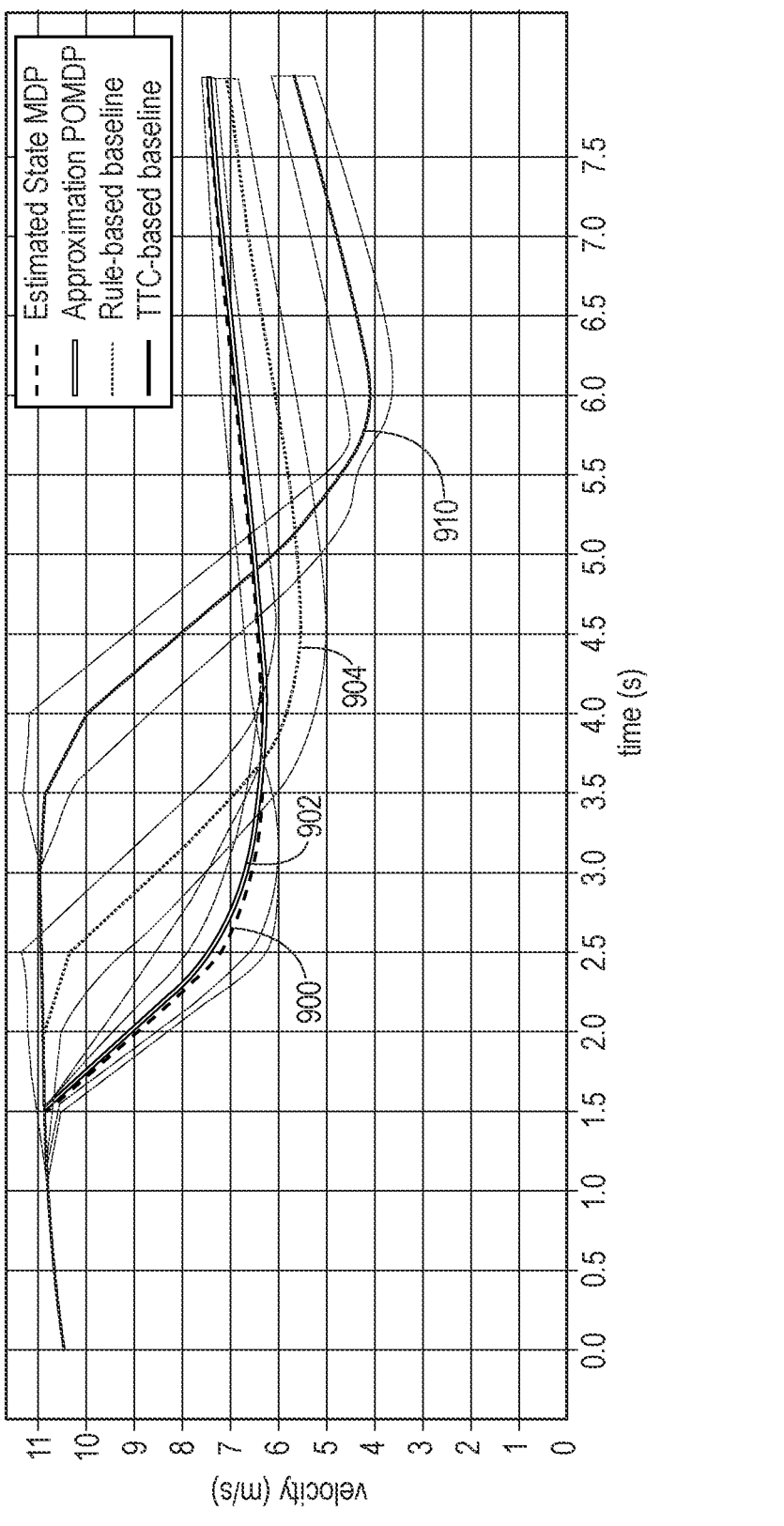
FIG. 9 is a plot depicting results from the simulation with respect to a speed profile in a front hard brake scenario.

FIG. 9 shows results of the simulation 600, particularly a closed-loop speed profile of the front hard brake scenario with an initial $d_{gap}$ of 13.5 meters. In this regard, FIG. 9 shows a first closed-loop speed profile 900 corresponding to the learning framework 300 with estimated state MDP, a second closed-loop speed profile 902 corresponding to the learning framework 300 with approximation partially observed MDP, a third closed-loop speed profile 904 corresponding to the rule-based warning generator 702, and a fourth closed-loop speed profile 910 corresponding to the TTC based warning system 700. As shown in FIG. 9, the learning framework 300 provides warnings earlier and leads to smoother trajectories by the vehicle 102, based on a comparison of the first closed-loop speed profile 900 and the second closed-loop speed profile 902 with the third closed-loop speed profile 904 and the fourth closed-loop speed profile 910.

Warning efficiency is evaluated by the count of warnings $w_t$ over different $d_{gap}$ during the experiments. Referring back to FIG. 7, as can be seen in Table II, since the rule-based warning generator 702 baseline does not model the ego driver's behavior and transition in the vehicle 102, the rule-based warning generator 702 baseline tends to give more warning than the learning framework 300. In this regard, the learning framework 300 and corresponding method shows better warning efficiency over the baselines established with the TTC based warning system 700 and the rule-based warning generator 702.

Methods for Operating the Information Generation System

Figure 10:
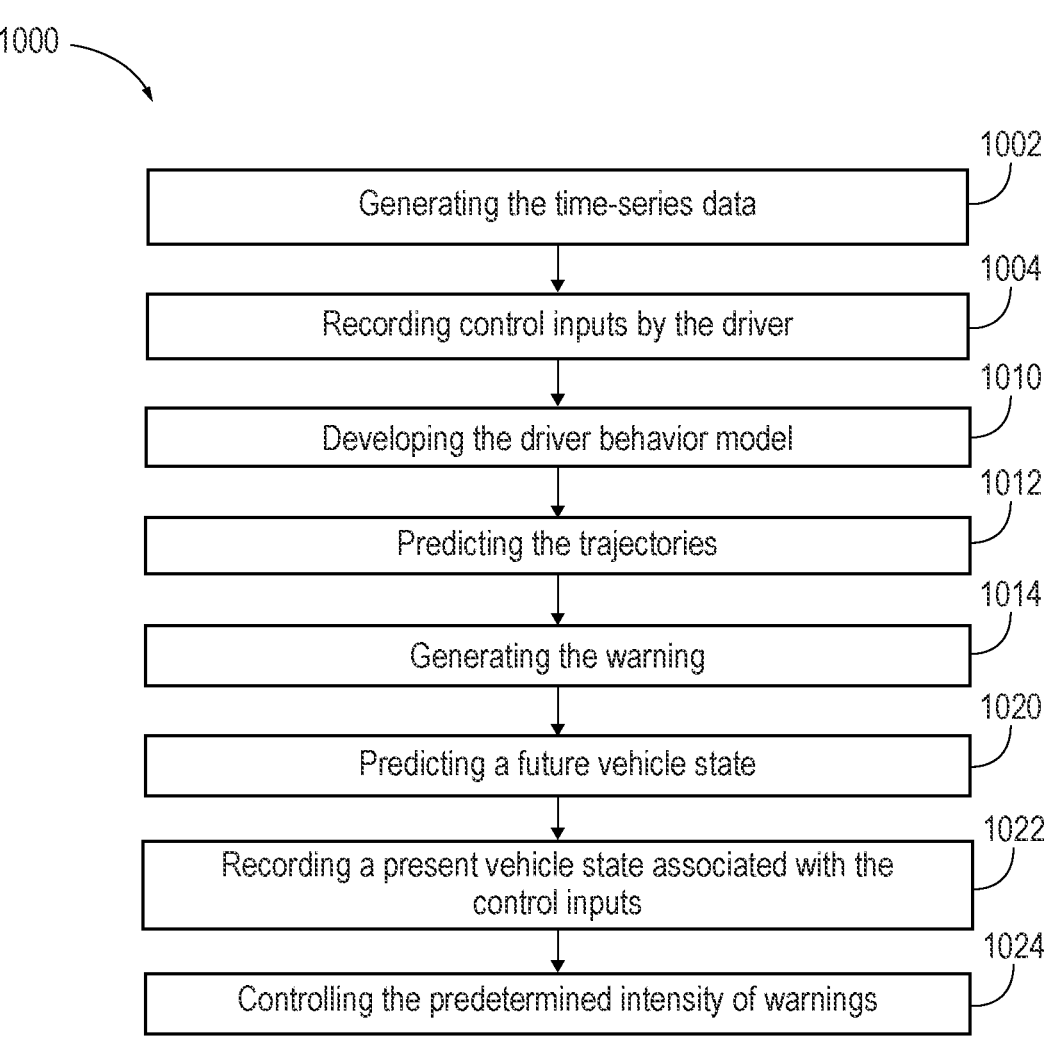
FIG. 10 is an exemplary process for generating a warning to a driver.

Referring to FIG. 10, a computer-implemented method 1000 for generating a warning to a driver of a vehicle. FIG. 10 will be described with reference to FIGS. 1-9.

For simplicity, the method 1000 will be described as a sequence of blocks, but the elements of the method 1000 may be organized into different architectures, elements, stages, and/or processes.

At block 1002, the method 1000 includes generating time-series data indicating positions of the objects 202 in the environment 200 surrounding the vehicle 102.

At block 1004, the method 1000 includes recording control inputs by the driver driving the vehicle 102.

At block 1010, the method 1000 includes developing the driver behavior model 302 associated with the driver driving the vehicle 102 based on the control inputs.

At block 1012, the method 1000 includes predicting trajectories of the objects 202 and the vehicle 102 based on the time-series data and the driver behavior model 302, and predicting a collision between the vehicle 102 and one of the objects 202 based on the predicted trajectories.

At block 1014, the method 1000 includes generating the warning 310 indicating the predicted collision to the driver.

At block 1020, the method 1000 includes predicting a future vehicle state based on the driver model 302. The future vehicle state predicted at block 1020 occurs after generating the warning 310, and indicates that the driver noticed the warning 310. Block 1020 also includes predicting a future vehicle state based on the driver model 302, where the future vehicle state occurs after generating the warning 310, and indicates that the driver did not notice the warning 310.

At block 1022, the method 1000 includes recording a present vehicle state associated with the control inputs.

At block 1024, the method 1000 includes controlling the predetermined intensity of warnings 310 generated when a present vehicle state matches the future vehicle state. Controlling the predetermined intensity of the warning 310 includes at least one of reducing a safety threshold associated with the predicted collision for generating the warning 310, increasing a duration of time the warning 310 is generated, increasing a number of times the warning 310 is generated during a period of time before the predicted collision, adding at least one of an audio output and a visual output to the warning 310, and increasing an intensity of at least one of the audio output and the visual output of the warning 310.

Figure 11:
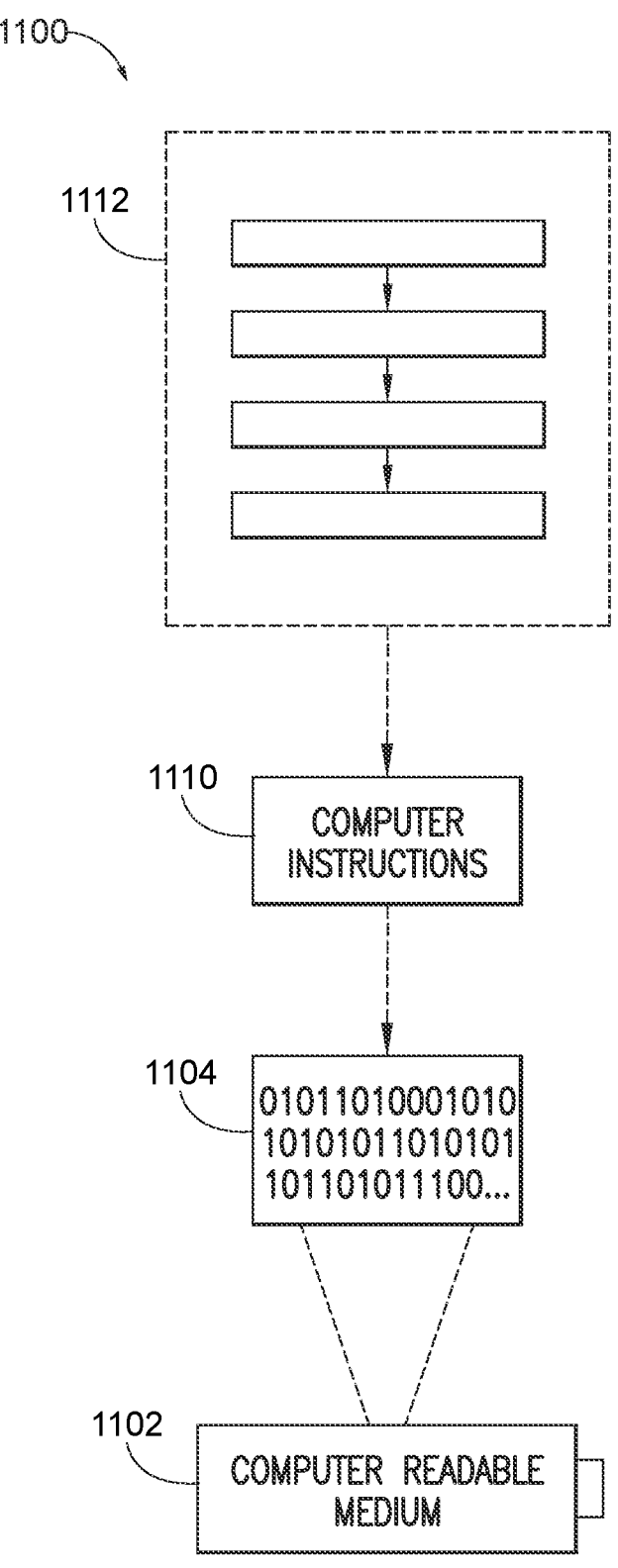
FIG. 11 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement one aspect of the techniques presented herein. An aspect of a computer-readable medium or a computer-readable device devised in these ways is illustrated in FIG. 11, where an implementation 1100 includes a computer-readable medium 1102, such as a CD-R, DVD-R, flash drive, a platter of a hard disk drive, etc., on which is encoded computer-readable data 1104. This encoded computer-readable data 1104, such as binary data including a plurality of zero's and one's as shown in 1104, in turn includes a set of processor-executable computer instructions 1110 configured to operate according to one or more of the principles set forth herein. In this implementation 1100, the processor-executable computer instructions 1110 may be configured to perform a method 1112, such as the method 1000 of FIG. 10. In another aspect, the processor-executable computer instructions 1110 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle comprising:

a ranged sensor that generates time-series data indicating positions of objects in an environment surrounding the vehicle;

a user interface configured to warn a driver of a predicted collision between the vehicle and one of the objects in the environment; and at least one processor including an electronic control unit operatively connected to the ranged sensor and the user interface, wherein the at least one processor:

records control inputs by the driver driving the vehicle;

develops a driver behavior model associated with the driver driving the vehicle based on the control inputs;

predicts trajectories of the objects and the vehicle based on the time-series data and the driver behavior model, and predicts a collision between the vehicle and one of the objects based on the predicted trajectories; and generates a warning indicating the predicted collision to the driver.

2. The vehicle of claim 1, wherein the at least one processor:

predicts a future vehicle state based on the driver behavior model, wherein the future vehicle state occurs after generating the warning, and indicates that the driver noticed the warning;

records a present vehicle state associated with the control inputs; and controls a predetermined intensity of warnings by the user interface when a present vehicle state matches the future vehicle state.

3. The vehicle of claim 1, wherein the at least one processor:

predicts a future vehicle state based on the driver behavior model, wherein the future vehicle state occurs after generating the warning, and indicates that the driver did not notice the warning;

records a present vehicle state associated with the control inputs; and controls an intensity of warnings by the user interface when the present vehicle state matches the future vehicle state.

4. The system of claim 3, wherein controlling the intensity of the warning includes at least one of:

reducing a safety threshold for generating the warning;

increasing a duration of time the warning is generated;

increasing a number of times the warning is generated during a period of time before the predicted collision;

adding at least one of an audio output and a visual output to the warning; and increasing an intensity of at least one of the audio output and the visual output.

5. The vehicle of claim 1, wherein the control inputs are first control inputs, the driver behavior model is a first driver behavior model, the predicted collision is a first predicted collision, the warning is a first warning, and after generating the first warning, the at least one processor:

records second control inputs by the driver driving the vehicle;

develops a second driver behavior model associated with the driver driving the vehicle based on the second control inputs;

predicts trajectories of the objects and the vehicle based on the time-series data and the second driver behavior model, and predicts a collision between the vehicle and one of the objects based on the predicted trajectories; and generates a second warning indicating the predicted collision to the driver.

6. The vehicle of claim 1, wherein for a duration of the driver driving the vehicle, the at least one processor repeatedly:

records the control inputs by the driver driving the vehicle, and a present vehicle state associated with the control inputs;

develops the driver behavior model associated with the driver driving the vehicle based on the control inputs and the present vehicle state;

predicts the trajectories of the objects and the vehicle based on the time-series data and the driver behavior model, and predicts a collision between the vehicle and one of the objects based on the predicted trajectories;

generates a warning indicating the predicted collision to the driver, wherein the warning has a predetermined intensity;

predicts future vehicle states based on the driver behavior model and the generated warning; and adjusts the predetermined intensity of the warning when the present vehicle state matches one of the future vehicle states.

7. The vehicle of claim 1, wherein the at least one processor:

records a present vehicle state associated with the control inputs;

develops the driver behavior model based on the control inputs and the present vehicle state;

determines whether the driver noticed the generated warning based on the present vehicle state; and controls a predetermined intensity of warnings by the user interface based whether the driver noticed the generated warning.

8. The vehicle of claim 1, wherein the at least one processor:

predicts first future vehicle states based on the driver behavior model, wherein the first future vehicle states occur after generating the warning, and indicate whether the driver noticed the warning;

predicts second future vehicle states that are each subsequent to, and depend from one of the first future vehicle states;

records a present vehicle state; and controls a predetermined intensity of warnings by the user interface when the present vehicle state matches one of the first future vehicle states, and then matches one of the second future vehicle states subsequent to the first future vehicle state.

9. The vehicle of claim 8, wherein the at least one processor predicts iterations of subsequent future vehicle states, including the second future vehicle states, to a time horizon corresponding with the predicted trajectories, wherein the iterations of subsequent future vehicle states each depend from one of the first future vehicle states or an intermediate iteration of subsequent future vehicle states, and indicate whether the driver noticed the warning; and controls the predetermined intensity of warnings by the user interface when the present vehicle state matches one of the first future vehicle states, and then matches a plurality of the iterations of subsequent future vehicle states that depend from the matched future vehicle state.

10. A method for generating a warning to a driver of a vehicle, the method comprising:

generating time-series data indicating positions of objects in an environment surrounding the vehicle;

recording control inputs by the driver driving the vehicle;

developing a driver behavior model associated with the driver driving the vehicle based on the control inputs;

predicting trajectories of the objects and the vehicle based on the time-series data and the driver behavior model, and predicting a collision between the vehicle and one of the objects based on the predicted trajectories; and generating a warning indicating the predicted collision to the driver.

11. The method of claim 10, further comprising:

predicting a future vehicle state based on the driver behavior model, wherein the future vehicle state occurs after generating the warning, and indicates that the driver noticed the warning;

recording a present vehicle state associated with the control inputs; and controlling a predetermined intensity of warnings generated when a present vehicle state matches the future vehicle state.

12. The method of claim 10, further comprising:

predicting a future vehicle state based on the driver behavior model, wherein the future vehicle state occurs after generating the warning, and indicates that the driver did not notice the warning;

recording a present vehicle state associated with the control inputs; and controlling a predetermined intensity of warnings generated when a present vehicle state matches the future vehicle state.

13. The system of claim 12, wherein controlling the predetermined intensity of the warning includes at least one of:

reducing a safety threshold associated with the predicted collision for generating the warning;

increasing a duration of time the warning is generated;

increasing a number of times the warning is generated during a period of time before the predicted collision;

adding at least one of an audio output and a visual output to the warning; and increasing an intensity of at least one of the audio output and the visual output.

14. The method of claim 10, wherein the control inputs are first control inputs, the driver behavior model is a first driver behavior model, the predicted collision is a first predicted collision, the warning is a first warning, and after generating the first warning, the method further comprises:

recording second control inputs by the driver driving the vehicle;

developing a second driver behavior model associated with the driver driving the vehicle based on the second control inputs;

predicting trajectories of the objects and the vehicle based on the time-series data and the second driver behavior model, and predicting a collision between the vehicle and one of the objects based on the predicted trajectories; and generating a second warning indicating the predicted collision to the driver.

15. The method of claim 10, wherein for a duration of the driver driving the vehicle, the method comprises repeatedly:

recording the control inputs by the driver driving the vehicle, and a present vehicle state associated with the control inputs;

developing the driver behavior model associated with the driver driving the vehicle based on the control inputs and the present vehicle state;

predicting the trajectories of the objects and the vehicle based on the time-series data and the driver behavior model, and predicting a collision between the vehicle and one of the objects based on the predicted trajectories;

generating a warning indicating the predicted collision to the driver, wherein the warning has a predetermined intensity;

predicting future vehicle states based on the driver behavior model and the generated warning; and adjusting the predetermined intensity of the warning when the present vehicle state matches one of the future vehicle states.

16. A non-transitory computer readable storage medium storing instructions that, when executed by at least one processor, causes the at least one processor to perform a method, the method comprising:

generating time-series data indicating positions of objects in an environment surrounding a vehicle;

recording control inputs by a driver driving the vehicle;

developing a driver behavior model associated with the driver driving the vehicle based on the control inputs;

predicting trajectories of the objects and the vehicle based on the time-series data and the driver behavior model, and predicting a collision between the vehicle and one of the objects based on the predicted trajectories; and generating a warning indicating the predicted collision to the driver.

17. The non-transitory computer readable storage medium of claim 16, wherein the method further comprises:

predicting a future vehicle state based on the driver behavior model, wherein the future vehicle state occurs after generating the warning, and indicates that the driver noticed the warning;

recording a present vehicle state associated with the control inputs; and controlling a predetermined intensity of warnings generated when a present vehicle state matches the future vehicle state.

18. The non-transitory computer readable storage medium of claim 16, wherein the method further comprises:

predicting a future vehicle state based on the driver behavior model, wherein the future vehicle state occurs after generating the warning, and indicates that the driver did not notice the warning;

recording a present vehicle state associated with the control inputs; and controlling a predetermined intensity of warnings generated when a present vehicle state matches the future vehicle state.

19. The non-transitory computer readable storage medium of claim 16, wherein the control inputs are first control inputs, the driver behavior model is a first driver behavior model, the predicted collision is a first predicted collision, the warning is a first warning, and after generating the first warning, the method further comprises:

recording second control inputs by the driver driving the vehicle;

developing a second driver behavior model associated with the driver driving the vehicle based on the second control inputs;

predicting trajectories of the objects and the vehicle based on the time-series data and the second driver behavior model, and predicting a collision between the vehicle and one of the objects based on the predicted trajectories; and generating a second warning indicating the predicted collision to the driver.

20. The non-transitory computer readable storage medium of claim 16, wherein for a duration of the driver driving the vehicle, the method comprises repeatedly:

recording the control inputs by the driver driving the vehicle, and a present vehicle state associated with the control inputs;

developing the driver behavior model associated with the driver driving the vehicle based on the control inputs and the present vehicle state;

predicting the trajectories of the objects and the vehicle based on the time-series data and the driver behavior model, and predicting a collision between the vehicle and one of the objects based on the predicted trajectories;

generating a warning indicating the predicted collision to the driver, wherein the warning has a predetermined intensity;

predicting future vehicle states based on the driver behavior model and the generated warning; and adjusting the predetermined intensity of the warning when the present vehicle state matches one of the future vehicle states.

* * * * *